United States Patent
Yamamoto

(10) Patent No.: US 10,282,645 B2
(45) Date of Patent: May 7, 2019

(54) COLOR PATCH LAYOUT DETERMINATION

(71) Applicant: KONICA MINOLTA LABORATORY U.S.A., INC., San Mateo, CA (US)

(72) Inventor: Kazuto Yamamoto, Foster City, CA (US)

(73) Assignee: KONICA MINOLTA LABORATORY U.S.A., INC., San Mateo, CA (US)

( * ) Notice: Subject to any disclaimer, the term of this patent is extended or adjusted under 35 U.S.C. 154(b) by 0 days.

(21) Appl. No.: 15/633,255

(22) Filed: Jun. 26, 2017

(65) Prior Publication Data
US 2018/0373967 A1 Dec. 27, 2018

(51) Int. Cl.
| | |
|---|---|
| B41J 2/21 | (2006.01) |
| G06F 3/12 | (2006.01) |
| H04N 1/60 | (2006.01) |
| G06K 15/02 | (2006.01) |
| B41J 29/393 | (2006.01) |

(52) U.S. Cl.
CPC ........... *G06K 15/027* (2013.01); *G06F 3/125* (2013.01); *G06F 3/1208* (2013.01); *H04N 1/6033* (2013.01); *B41J 2/2146* (2013.01); *B41J 29/393* (2013.01); *B41J 2029/3935* (2013.01); *G03G 2215/0161* (2013.01); *G03G 2215/0164* (2013.01); *G06K 15/1878* (2013.01)

(58) Field of Classification Search
None
See application file for complete search history.

(56) References Cited

U.S. PATENT DOCUMENTS

| | | | | |
|---|---|---|---|---|
| 6,839,066 | B2* | 1/2005 | Muramoto | H04N 1/6055 345/531 |
| 7,436,549 | B2* | 10/2008 | Venable | H04N 1/6033 358/1.9 |
| 7,486,414 | B2* | 2/2009 | Arai | G03G 15/5062 358/1.9 |
| 9,036,215 | B2* | 5/2015 | Ishizuka | G03G 15/5058 358/1.9 |
| 2006/0066882 | A1* | 3/2006 | Yamauchi | H04N 1/6033 358/1.9 |
| 2007/0229870 | A1* | 10/2007 | Doi | H04N 1/6033 358/1.9 |
| 2009/0231623 | A1* | 9/2009 | Kuwahara | B41J 29/02 358/1.15 |
| 2013/0135698 | A1* | 5/2013 | Sumioka | H04N 1/00607 358/498 |

(Continued)

FOREIGN PATENT DOCUMENTS

| | | |
|---|---|---|
| JP | 2008-260144 A | 10/2008 |
| JP | 2015-196334 A | 11/2015 |

*Primary Examiner* — Miya J Williams
(74) *Attorney, Agent, or Firm* — Squire Patton Boggs (US) LLP

(57) ABSTRACT

A color test pattern comprising color patches can be printed together with an image (text and/or a pictures, for example) of a print job. After printing, reflections, known as flare, from the image may adversely affect measurements taken of the color patches. To help reduce the effects of flare, a determination is made prior to printing as to the layout of the color patches. The determination involves comparing the color properties of the color patches with those of the image.

20 Claims, 11 Drawing Sheets

(56) References Cited

U.S. PATENT DOCUMENTS

| | | | |
|---|---|---|---|
| 2016/0114607 A1* | 4/2016 | Yamagishi | H04N 1/6033 347/19 |
| 2016/0212303 A1 | 7/2016 | Tsuchiya | |
| 2017/0094125 A1 | 3/2017 | Yamamoto | |

* cited by examiner

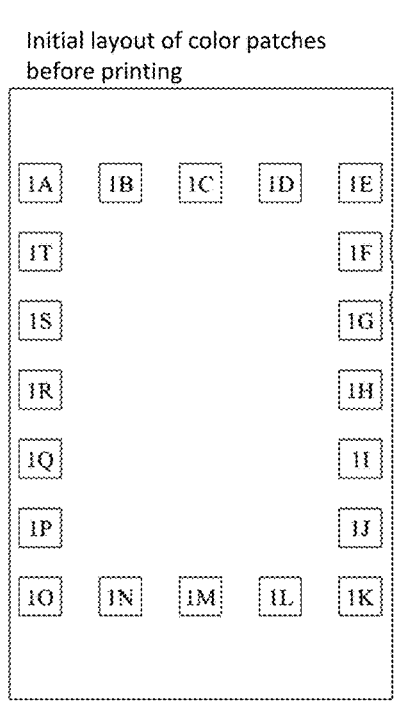
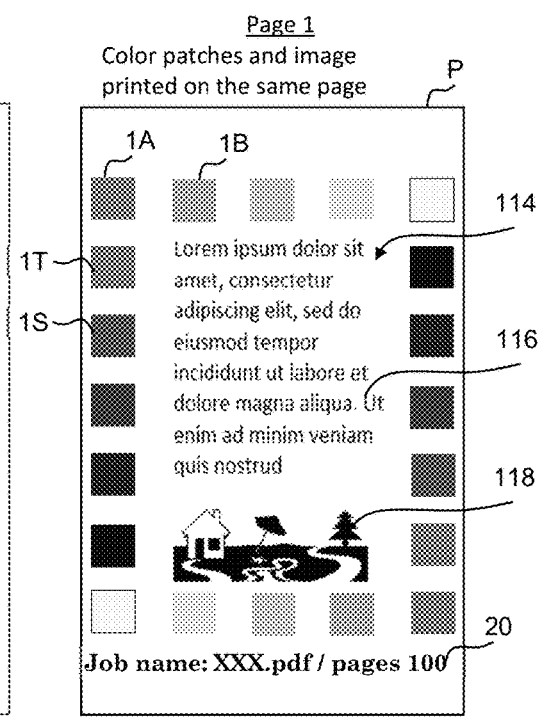
FIG. 5A  FIG. 5B

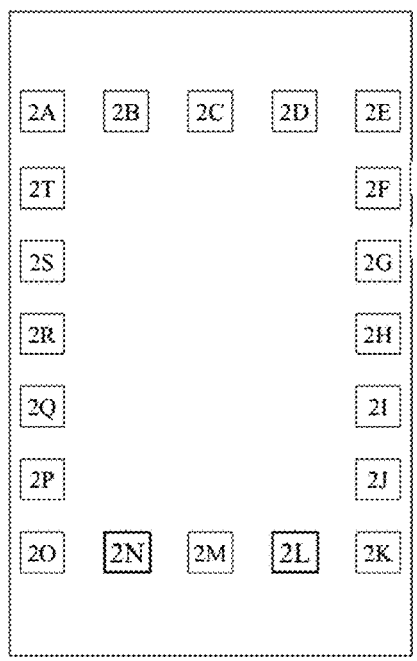
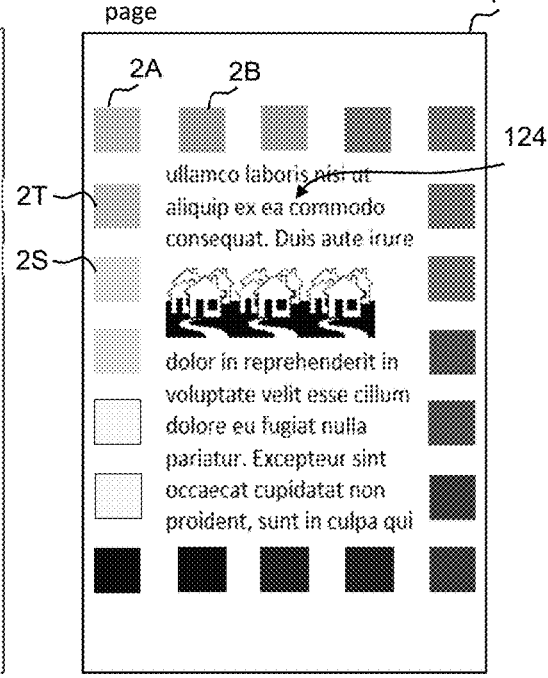
FIG. 6A  FIG. 6B

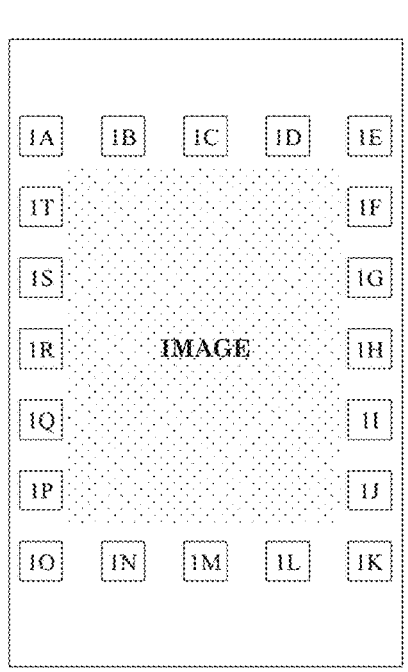
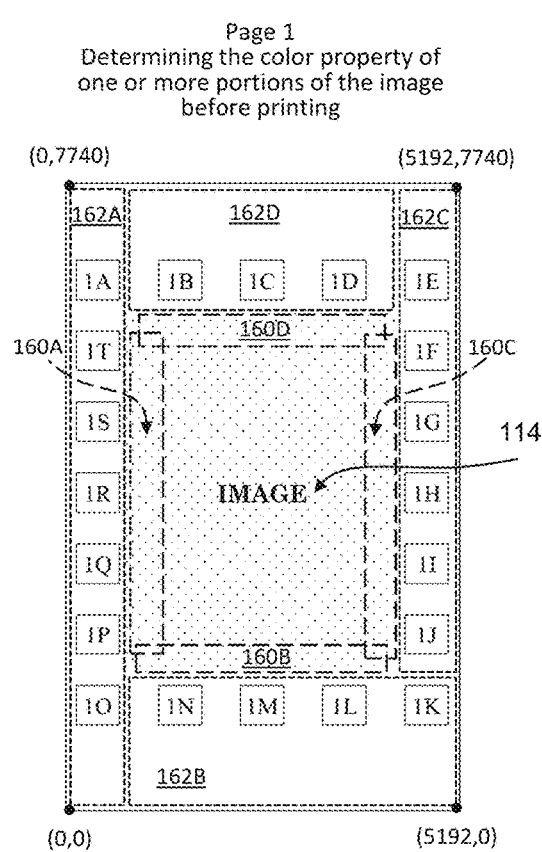
FIG. 8  FIG. 9

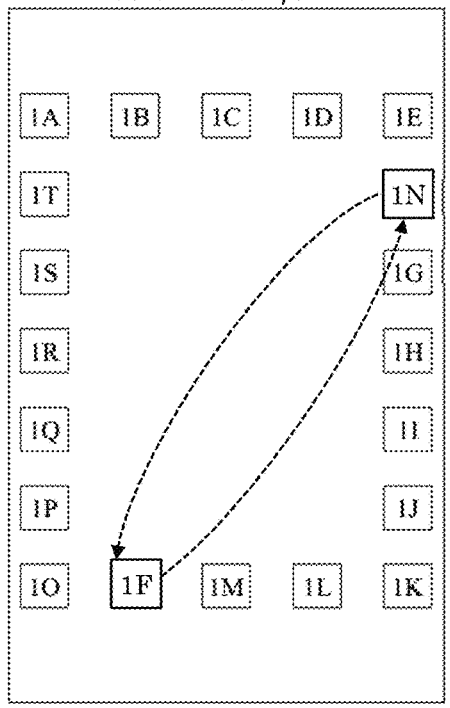
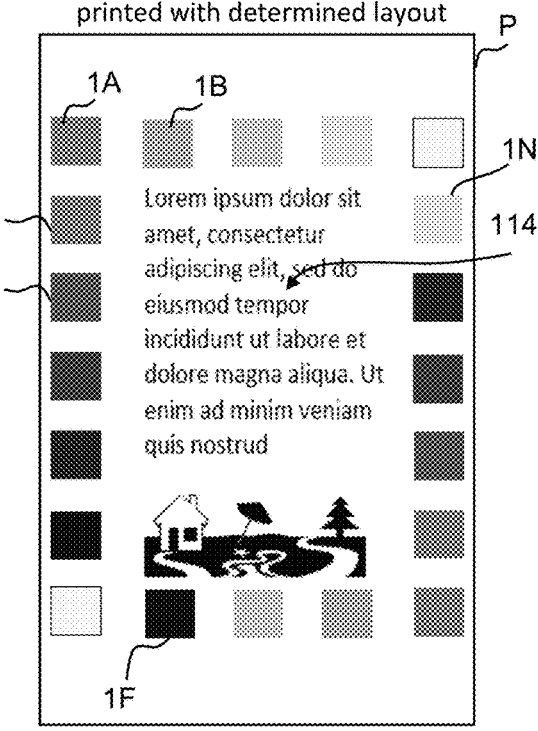
FIG. 10A  FIG. 10B

COLOR PATCH LAYOUT DETERMINATION

FIELD

This disclosure relates generally to printing technology and, more particularly, to a method, system, and computer readable medium for maintaining print quality.

BACKGROUND

The color output of a printing machine may drift over time. The quality of printed images that are output by a printing machine can be maintained by periodically performing a color validation process which involves having the printing machine print a color test pattern. The color test pattern includes color patches, each or which are expected to have a target color property. After printing, the color properties of the color patches are measured and compared with the target properties. If measurements do not match the target properties, then an alert is generated and/or a color calibration process can be performed in which operational parameters of the printing machine are adjusted.

During measurement, light is directed onto the sheet on which color patches were printed. Light reflected from a subject color patch is picked up by a sensor to reveal the color property the color patch. However, the sensor can also pick up light reflected from areas of the printed sheet that surround the sensor. The light reflected from surrounding areas, referred to as flare, can introduce inaccuracies in the measurement for the subject color patch. There is a continuing need to improve the quality of printed images and, particularly, a need to reduce inaccuracies related to flare.

SUMMARY

Briefly and in general terms, the present invention is directed to a method, printing system, and non-transitory computer readable medium for color patch layout determination.

In aspects of the invention, a method comprises storing a patch color property of a color patch before the color patch is printed, determining an image portion color property of a portion of an image before the image is printed, comparing the patch color property and the image portion color property, and determining a layout of the color patch based on the comparison of color properties, the determined layout including any of a determined print size of the color patch and a determined print position of the color patch which are to be used when printing the color patch.

In aspects of the invention, a printing system comprises a printer, a memory, and a printer processor. The printer processor is configured to control the printer, store, in the memory, a patch color property of a color patch before the color patch is printed by the printer, determine an image portion color property of a portion of an image before the image is printed by the printer, compare the patch color property and the image portion color property, and determine a layout of the color patch based on the comparison of color properties, the determined layout including any of a determined print size of the color patch and a determined print position of the color patch which are to be used by the printer when printing the color patch.

In aspects of the invention, a non-transitory computer readable medium has a program stored therein for controlling a printing system, the program causing a printer processor of the printing system to execute a process for color patch layout determination. The process comprises storing a patch color property of a color patch before the color patch is printed, determining an image portion color property of a portion of an image before the image is printed, comparing the patch color property and the image portion color property, and determining a layout of the color patch based on the comparison of color properties, the determined layout including any of a determined print size of the color patch and a determined print position of the color patch which are to be used when printing the color patch.

The features and advantages of the invention will be more readily understood from the following detailed description which should be read in conjunction with the accompanying drawings.

BRIEF DESCRIPTION OF THE DRAWINGS

FIG. 5A is a plan view diagram showing an example initial layout of color patches superimposed on a hypothetical sheet before the color patches are printed.

FIG. 5B is a plan view diagram showing the color patches of FIG. 5A printed, without a change in layout, together with an image for page 1 of a print job.

FIG. 6A is a plan view diagram showing an example initial layout of color patches superimposed on a hypothetical sheet before the color patches are printed.

FIG. 6B is a plan view diagram showing the color patches of FIG. 6A printed, without a change in layout, together with an image for page 2 of a print job.

FIG. 8 is a plan view diagram showing, superimposed on a hypothetical sheet, an example initial layout of color patches and an image for page 1 of a print job.

FIG. 9 is a plan view diagram of FIG. 8 with boundaries additionally superimposed, the boundaries indicating portions of the image and portions of the trim area of the sheet.

FIGS. 10A and 10B are plan view diagrams showing color patch layouts with two of the color patch layouts having been changed by switching positions.

DETAILED DESCRIPTION

Figure 1:
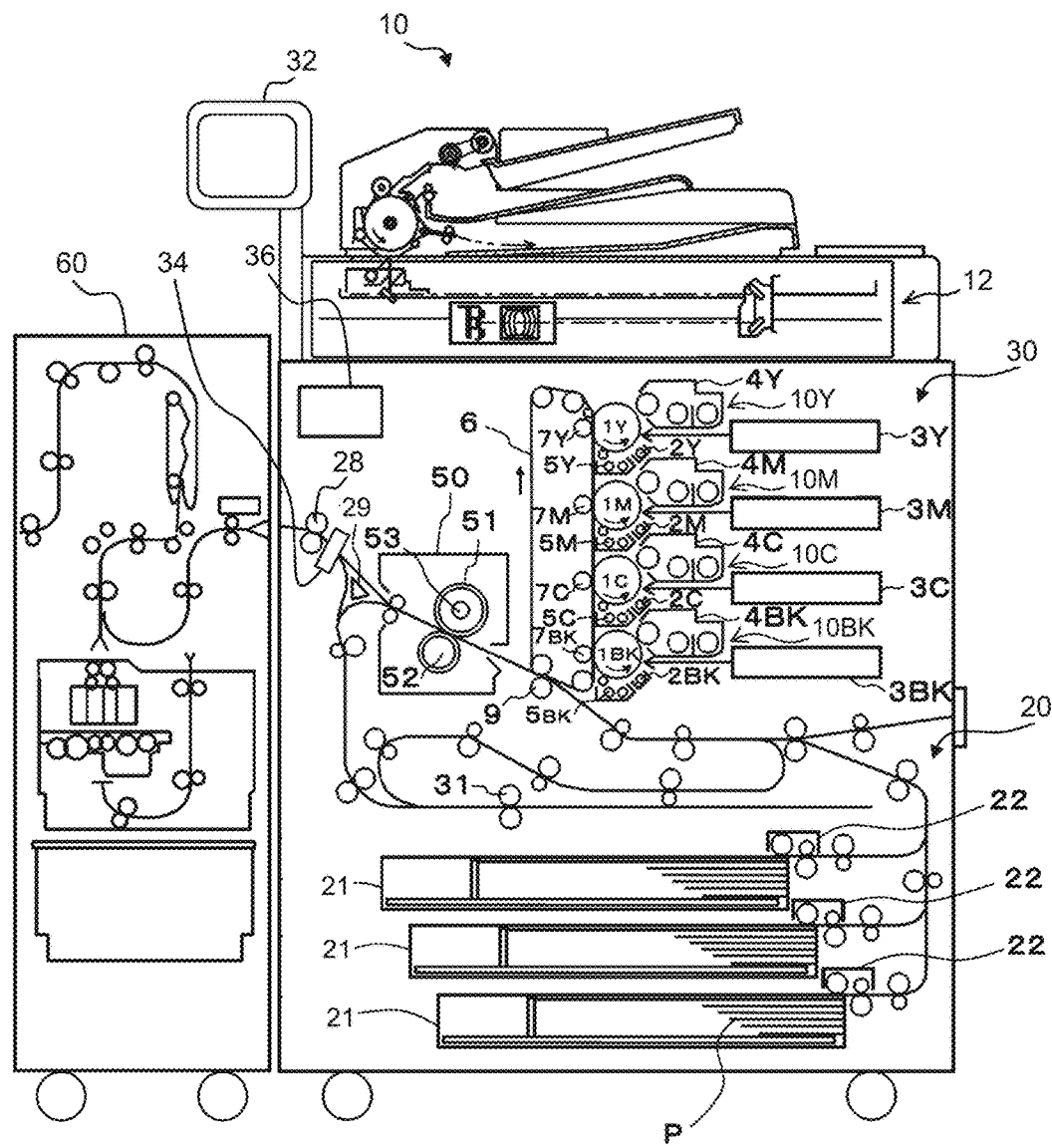
FIG. 1 is a schematic diagram showing the interior of an example printing machine.

As used herein, the term "paper" refers to any type of printable substrate on which an image may be applied. The term "paper" encompasses pulp paper made by pressing cellulose pulp fibers into flat sheets, plastic films and sheets (for example, transparency films and acetate sheets), and the like.

As used herein, the term "image" encompasses any one or a combination of photographs, pictures, illustrations, alphanumeric and linguistic characters, symbols, and other graphical representations.

The term "sheet" and the phrases "paper sheet" and "sheet of paper" have the same meaning and refer to a distinct piece of printable substrate. For example, a "paper sheet" could be a distinct piece of pulp paper, plastic sheet, or the like.

The term "print job" relates to a set of printing instructions in computer language. For example, a user (person) may create a first print job that instructs a printing machine to make ten copies of a document. The printing instructions in the print job could be in the form a page description language (PDL) or other format. Example page description languages include PostScript (R), Printer Control Language, Portable Document Format (PDF), and XML Paper Specification (XPS).

As used herein, "printing machine" encompasses a variety of machines capable of forming an image on a printable substrate. Examples of printing machines include, without limitation, copying machines wherein physical documents are optically scanned to capture images on the documents so that the images can be duplicated onto printable substrate; laser, inkjet, and other types of printing machines wherein image data of an electronic file, such as a file from a word processing, graphics or other type of computer program, is processed for printing onto printable substrate; and a multifunction peripheral (MFP) device having the combined functions of a copying machine and printing machine.

As used herein, the term "color property" encompasses colorimetric parameters that define, at least in part, a color of a subject. Colorimetric parameters can be coordinates in a color space or model, such as any one of those developed or adopted by the Commission Internationale de l'Eclairage (CIE), or International Commission on Illumination in English. An example color space is L*a*b*, in which the colorimetric parameters are L*, a*, and b*. The color property can represented by L* alone, any two of the colorimetric parameters, or all three colorimetric parameters. Another example color space is L*c*h*, in which the colorimetric parameters are L*, c*, and h*. Here too, color property can represented by L* alone, any two of the colorimetric parameters, or all three colorimetric parameters. Other color spaces are HSB (also known as or HSL) and CIE XYZ.

As used herein, the phrases "including any of" and "includes any of" means that a subject includes one or any combination of a subsequent list. For example, when X includes any of A, B and C, then X may include A, may include B, may include C, may include A and B, may include B and C, may include A and C, or may include A, B and C.

Referring now in more detail to the example drawings for purposes of illustrating aspects of the invention, wherein like reference numerals designate corresponding or like elements among the several views, there is shown in FIG. 1 an example printing system comprising printing machine 10 in the form of an MFP device capable printing in color. To briefly summarize, printing machine 10 includes a plurality of photoreceptors arranged vertically in tandem and in opposition to an intermediate transfer belt. Color toner images are applied to the intermediate transfer belt by the photoreceptors. The intermediate transfer belt applies the toner images to sheets of paper. It is to be understood that the invention may be embodied in or make use of a printing machine configured in ways other than what is illustrated.

Printing machine 10 is capable of receiving a print job, which can be one that was sent to printing machine 10 or can be one that is generated at printing machine 10 when a physical document is placed by a user on printing machine 10 for duplication. For example, a print job can be sent by a user to printing machine 10 from a data processing apparatus, such as a remote computer or remote scanner.

Printing machine 10 includes document scanner 12, printer 30, monitor screen 32, color sensor 34, and controller 36. Monitor screen 32 is configured to display print settings and can be a liquid crystal display or other type of electronic visual display device. Monitor screen 32 may include a touch-sensitive layer to facilitate user selection of print settings. Monitor screen 32 may include one or a combination of a keypad with buttons to allow for other user input.

The printing system further comprises finishing device 60, which trims printed sheets of paper and may perform other finishing tasks, such as stapling, collation, and binding. Finishing device 60 may form an integral part of printing machine 10, or it be a stand-alone device configured to be selectively detached and connected to printing machine 10.

Figure 2:
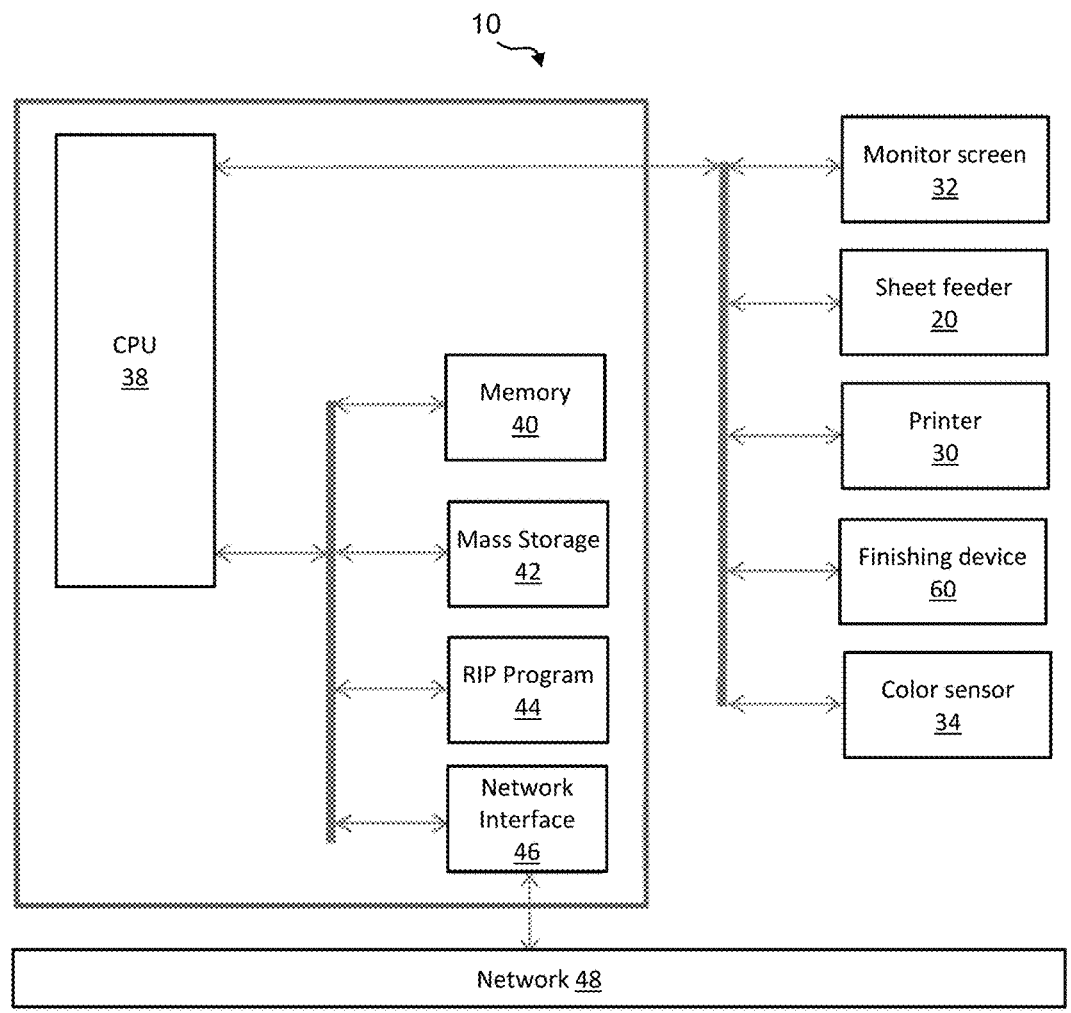
FIG. 2 is a schematic block diagram showing elements of the printing machine of FIG. 1.

Document scanner 12 scans a document image on each page of a document to expose it to light. Reflected light from the document image is received by an image sensor, which generates an image signal that is provided to an image processor. The image processor performs various processes on the image signal, such as analog-to-digital (A/D) conversion, shade correction, and the like. The image processor outputs the result as image data to controller 36. Alternatively, controller 36 may receive image data from a source external to printing machine 10. For example, image data may be received through network 48 (FIG. 2).

Printer 30 includes image-forming units 14Y, 14M, 14C and 14BK and fixing apparatus 50. Image-forming units 14Y, 14M, 14C and 14BK form yellow (Y), magenta (M), cyan (C), and black (BK) images, respectively. The letters Y, M, C, and BK refer to process colors and are used in FIG. 1 to differentiate image-forming components belonging to a particular image-forming unit. If no letter is used in a description for an image-forming component below, then the description applies to the image-forming components for all image-forming units.

Image-forming unit 14 includes photosensitive drum 1, charging assembly 2 arranged around photosensitive drum 1, optical writing assembly 3, developing assembly 4, and drum cleaner 5. Charging assembly 2 applies a static charge on the cylindrical surface of photosensitive drum 1. Optical writing assembly 3 scans laser light onto photosensitive drum 1 to form an electrostatic latent image on the cylindrical surface. Developing assembly 4 applies toner of a particular process color to the electrostatic latent image, thereby forming a single-color toner image. Drum cleaner 5 removes residual toner from drum 1.

Primary transfer rollers 7 transfer and combine the single-toner images onto transfer belt 6. The single-color toner images are combined into a multi-color toner image. Secondary transfer roller 9 transfers the multi-color toner image to a sheet of paper P that was conveyed from sheet feeder 20. Sheet feeder 20 feeds sheets P on a conveying path toward transfer belt 6. Sheet feeder 20 includes paper trays 21 and feeding assemblies 22. Each feeding assembly 22 takes sheets P one by one from a paper tray and moves the sheets to the conveying path. There are a plurality of belts, rollers, guide rails, and electric motors along the conveying path that move the sheets to transfer belt 6.

Fixing apparatus 50 fixes the multi-color toner image on sheet P by applying pressure and heat using fixing rollers 51 and 52. Heat is supplied by heater 53. Next, ejection rollers 28 eject sheet P to finishing device 60. Before sheet P is ejected during two-sided printing, gate 29 diverts sheet P to reverse rollers 31. When sheet P reaches reverse rollers 31, reverse rollers 31 change rotation in the opposite direction, which causes sheet P to return to the conveying path with its other side facing transfer belt 6. The other side of sheet P is printed with an image in the manner described above for the first side, and then sheet P is ejected by ejection rollers 28.

Before ejection, color sensor 34 measures the color property of one or more color patches (described later) that have been printed on sheet P. Color sensor 34 can be an RGB scanner, a spectral scanner with a photo detector, or other color-sensing device. In the example of FIG. 1, color sensor 34 is arranged on a printed paper path located upstream of (before) ejection roller 28. In another example, color sensor 34 may arranged on a printed paper path located downstream of (after) ejection roller 28, such as within finishing device 60. Color sensor 34 is referred to as an in-line color sensor in that that it is in line with a paper conveying path, and remains stationary while sheet P passes across the vision line of the color sensor. Color sensor 34 includes a light source that illuminates at least a portion of sheet P as it passes across the vision line. Reflected light from the color patch is received by color sensor 34, which generates signals representative of the color property of the color patch. Those signals are provided to controller 36 for use in color validation.

As shown in FIG. 2, controller 36 includes a microcomputer or central processing unit 38 (an example of a printer processor), memory 40, mass storage 42, RIP (raster image processing) program 44, and network input/output (I/O) interface 46. CPU 38 includes one or more computer processors having circuitry that execute instructions. CPU 38 is configured to perform various methods and processes described herein by executing instructions. Instructions executed by CPU 38 include those required to operate, control, and/or coordinate the various assemblies and components of printing machine 10 described above. Such instructions are collectively referred to as a printer controller program. CPU 38 may run an operating system (OS), which acts as an intermediary between software programs and hardware components.

Memory 40 includes random access and ready-only memory modules. Mass storage 42 can be any one or a combination of optical, magnetic, and solid-state flash storage devices. Memory 40 and/or mass storage 42 may store, in non-transitory form, various parts of the printer controller program, other programs, and/or the OS, which when executed, cause printing machine 10 to perform the methods and processes described herein.

RIP processing is a process that converts image data into raster image data, which is provided to printer 30 to form latent images on photosensitive drums 1Y, 1M, 1C, and 1BK. Network interface 46 includes circuitry that enables printing machine 10 to communicate through network 48 with a data processing apparatus, such as a remote computer or remote scanner. Network interface 46 may be configured for wired or wireless communication using radio frequency (RF) and/or infrared (IR) signals. Network 48 may comprise any one or a combination of a local area network (LAN), wide area network (WAN), portions of the Internet, and telephone communication carriers.

Figure 3:
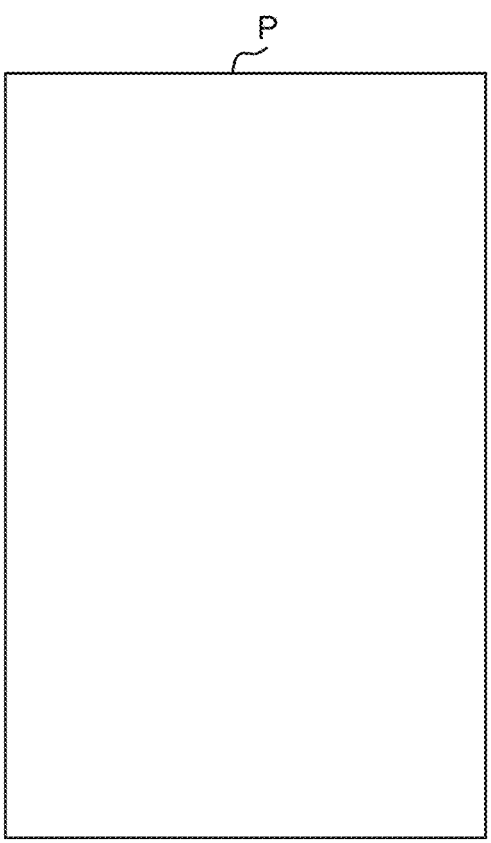
FIG. 3 is a plan view diagram showing the edges of a blank sheet of paper.
Figure 4:
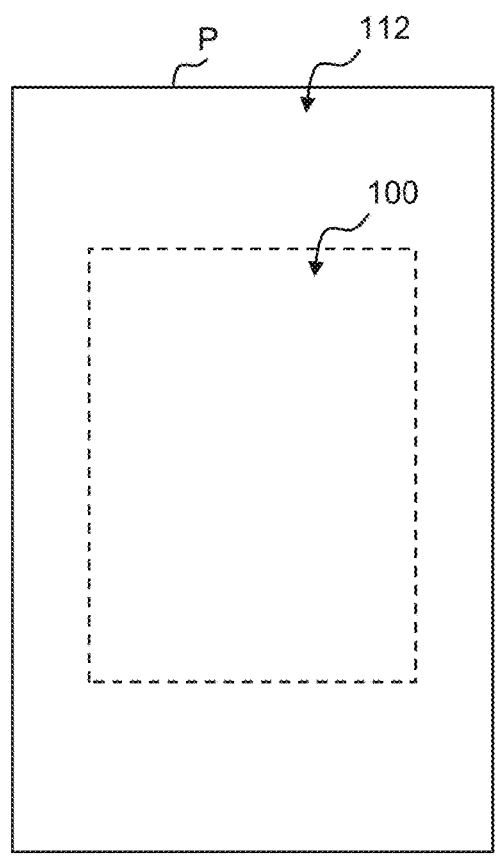
FIG. 4 is a plan view diagram showing main and trim areas of the sheet.

FIGS. 3 and 4 show the outline or edges of a blank sheet of paper, P, which is illustrated in solid line. The broken line encloses main area 100 at the center of the sheet, which is where images of the print job are to be printed. Trim area 112 is the remainder of the sheet outside of the broken line. Trim area 112 surrounds main area 100. Trim area 112 is where color patches will be printed for one or more pages of the print job. Color patches will not be printed in main area 100. Images of the print job will not be printed in trim area 112.

Trim area 112 is cut off and discarded during a finishing process after the sheet is printed with a desired image in main area 100. For example, a print job may specify that images be printed on finished sheets that are A4 size, so the broken line in FIG. 4 can correspond to the outline of an A4 size sheet. The actual sheet P that is feed through the printing machine is larger, such as SRA4 size. A finishing device cuts the SRA4 size sheet down to A4 size.

FIG. 5A shows an initial layout of each of twenty color patches which have not yet been printed. As the color patches are not yet printed, the initial layouts are superimposed over a hypothetical sheet for reference. The term "layout," as used with an individual color patch, refers to the size and position of the color patch. Each color patch has a rectangle shape. The color property is uniform throughout each color patch. The color property of each color patch is different from that of an adjacent color patch. The color patches are designated 1A to 1T, with numeral 1 indicating that the patches are initially intended to be printed together as a group on a sheet. Letters A to T serve to distinguish the color patches from one another for ease of discussion.

FIG. 5B shows the color patches of FIG. 5A printed with a page-1 image 114 on sheet P. Page-1 image 114 is an image specified by the print job to be printed on the first page of the print job. The color patches are printed in trim area 112 (FIG. 4), and image 114 is printed in main area 100 (FIG. 4). Image 114 contains text 116 and pictures 118 as a non-limiting example. In this example, text 116 is arbitrary without any particular meaning. It is to be understood that the text can be in any language, or there may be no text at all in the printed image of other examples. In further examples, the printed image may contain no text and only pictures.

The color patches are used for a color validation process. In general, color validation may be performed using color patches which are printed separately from the image. Color patches can be printed on one sheet, and images of the print job can be printed on other sheets. However, this approach would lead to more wasted paper. Waste is reduced by printing color patches on an area of the sheet that will normally be discarded.

Job information 120 was also printed in trim area 112. Job information includes text that identifies a customer or describes a print job to which the image belongs. The text may also indicate the number of pages of the print job. The job information allows a user (person), such as a worker in a print shop, to easily identify the print job. Printing of the job information is optional, in that it does not have to be printed with color patches. When printed with color patches, it may be desirable to select a color that is compatible with that of adjacent color patches to reduce effects of flare, as will be described below.

In FIG. 5B, the layouts of the color patches were not changed from the initial layouts when the color patches were printed. However, it may be desirable to change the layouts prior to printing to reduce effects of flare, as will be described below for FIG. 7.

The total number of color patches required for color validation can be greater or less than twenty. The total number can be in the hundreds or thousands, depending on the quality level required for a particular print job. Since the size of the trim area is quite limited, it may be desirable to print color patches on multiple sheets.

FIG. 6A shows an initial layout of twenty more color patches which have not yet been printed. As the color patches are not yet printed, the initial layouts are superimposed over a hypothetical sheet for reference. The additional color patches have color properties which are different from those in FIG. 5A. In FIG. 6A, the color patches are designated 2A to 2T, with numeral 2 indicating that the patches are initially intended to be printed together as a group on a sheet. Letters A to T serve to distinguish the color patches from one another for ease of discussion and do not necessary indicate relationships with patches 1A to 1T in FIG. 5A.

FIG. 6B shows the color patches of FIG. 6A printed with a page-2 image 124 on sheet P. Page-2 image 124 is an image specified by the print job to be printed on the second page of the print job. In FIG. 6B, the layouts of the color patches were not changed from the initial layouts when the color patches were printed. However, it may be desirable to change the layouts prior to printing to reduce effects of flare, as will be described below for FIG. 7.

Figure 7:
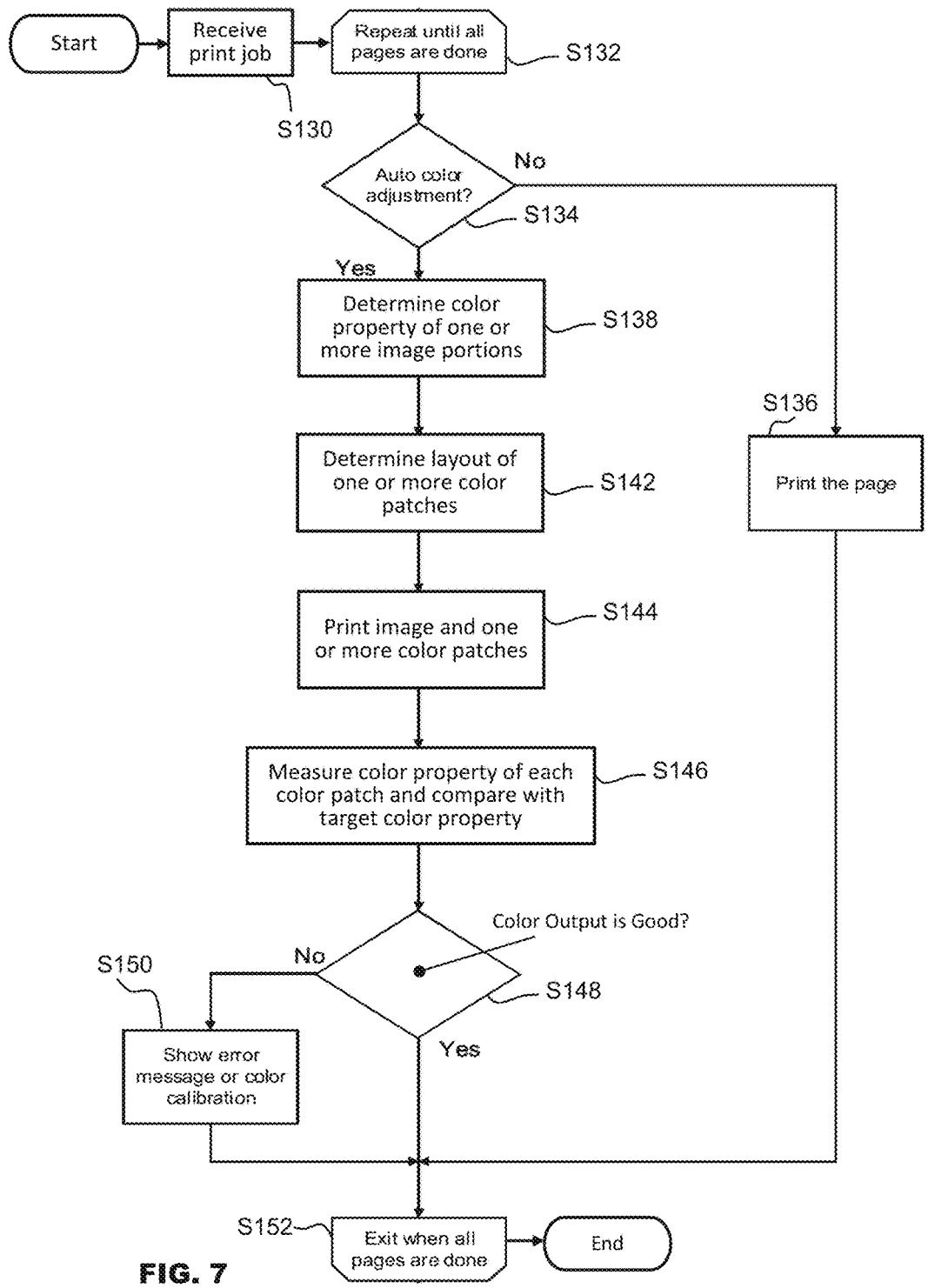
FIG. 7 is a flow chart showing an example method with color patch layout determination.

FIG. 7 shows an example process that can determine whether the layout of one or more color patches should be modified from its initial layout to reduce effects of flare. At block S130, a print job is received by the printing machine. The print job could have been sent to the printing machine via a network from a remote computer, scanner, or data processing apparatus. The print job could have been generated by the printing machine, such as when a user places a document on the printing machine for duplication.

Next is loop start block S132, which indicates that intervening blocks (blocks between S132 and S152) will be repeated until all pages of the print job are done. The intervening blocks represent a color validation process with color patch determination. The intervening blocks begin with page 1 of the print job, and those blocks are repeated for each subsequent page specified by the print job.

At block S134, the printer processor checks whether color validation should be performed with the current page. For example the printer processor may check whether a color validation flag is on, and color validation is performed if the color validation flag is on. The color validation flag may be turned on based on: information in the print job, environmental conditions (for example, a change temperature or humidity of surrounding air); conditions associated with the printing machine (for example, number of pages since the previous color validation); temperature or operational status of components of the printing machine; or user input of a command at the printing machine or data processing apparatus which is connected to the printing machine.

If no color validation is to be performed (S134:NO), the process proceeds to block S136 where the current page is printed on a sheet of paper without any color patches. The process continues to S152, where the next page of the print job is processed.

If color validation is to be performed (S134:YES), the process proceeds to block S138 where the color property of at least one image portion is determined and the color property of at least one color patch is stored. The printer processor analyzes the image to be printed on the current page. For example, the printer processor may analyze the image data to identify one or more portions of the image, and data for each image portion is analyzed to determine a color property of that image portion.

FIG. 8 shows the initial layout of twenty different color patches 1A to 1T superimposed over a hypothetical sheet together with the location of an image which would be printed on the sheet. FIG. 9 is an example in which color validation is to be performed with page 1 of the print job. FIG. 9 shows the initial layouts for color patches from FIG. 8 superimposed over a hypothetical sheet together with the position of image 114 which would be printed on page 1. Image 114 is divided into four image portions 160: left side edge (160A), bottom edge (160B), right side edge (160C), and top edge (160D). The printer processor determines an image portion color property for each image portion 160. The image portion color property may differ among image color portions 160.

For example, the determined image portion color property may include a value for L*, representing lightness in a color space. Other colorimetric parameters can be used, such as a*, b*, c* and/or h*. As another example, the determined image portion color property may include separate values for any one or more of the process colors C, M, Y and BK. A value can be the average or mean value for the entire image portion.

Trim area 12 may be divided into various trim area portions: left side (162A), bottom (162B), right side (162C), and top (162D). TABLE I and FIG. 9 show an example showing the location of trim area portions 162. The locations can be defined by sheet coordinates (X1, Y1) and (X2, Y2), which are diagonally opposed corners of the trim area portion.

TABLE I

|    | Trim Area Portion 162A | Trim Area Portion 162B | Trim Area Portion 162C | Trim Area Portion 162D |
|----|------------------------|------------------------|------------------------|------------------------|
| X1 | 0                      | 176                    | 5016                   | 176                    |
| Y2 | 0                      | 0                      | 176                    | 7652                   |
| X1 | 176                    | 5192                   | 5192                   | 5016                   |
| Y2 | 7740                   | 176                    | 7740                   | 7740                   |

The printer processor determines the color property of image portions adjacent to each trim area portion 162. For example, image portion 160A (left edge) is adjacent to trim area portion 162A (left), image portion 160B (bottom edge) is adjacent to trim area portion 162B (bottom), and so on. TABLE II shows an example of color properties, in terms of CMYBK, determined by the printer processor from image data for image portions 160 adjacent to trim area portions 162.

TABLE II

| Trim Area Portion | Adjacent Image Portion | Color Property (in terms of C, M, Y, BK) of Adjacent Image Portion | | | |
|-------------------|------------------------|------|---------|--------|-------|
|                   |                        | Cyan | Magenta | Yellow | Black |
| 162A (left)       | 160A (left)            | 236  | 65      | 5      | 10    |
| 162B (btm)        | 160B (btm)             | 0    | 95      | 48     | 0     |
| 162C (right)      | 160C (right)           | 224  | 55      | 7      | 12    |
| 162D (top)        | 160D (top)             | 218  | 30      | 48     | 50    |

In the example of TABLE II, adjacent image portions are generally blue (high values for cyan) except for bottom edge image portion 160B, which is bright orange. This information could be used in block S142, where it is determined whether to change the layout of any color patch in bottom trim area portion 162B which can be greatly affected by flare from bright orange. For example, a color patch that is a dark color, such as dark green, could be greatly affected by flare from bright orange, so it may be advantageous to change the print position or print size of that color patch if it is initially located in bottom edge image portion 160B.

At block S142 of FIG. 7, the printer processor determines the layout of at least one color patch. This determination can be performed for one, two, three, or any number of the color patches in FIG. 9. This determination is accomplished by comparing the patch color property and an image portion color property. As indicated above, there are four image portions 160. To address flare for a particular color patch, the image portion of greatest concern would the one near the particular color patch. Thus, for a particular patch, its color property could be compared to the color property of an image portion which is nearest to the particular color patch. For example, to determine the layout of patch 1N in FIG. 9, the patch color property of patch 1N is compared to the color property of bottom edge image portion 160B.

In block S142, a comparison of color properties is used to determine whether the image portion is brighter than the color patch, and/or determine whether the image portion has a hue that is different from that of the color patch. If significantly brighter or significantly different in hue, it may be desirable to change the layout of the color patch, such as move the color patch away from that particular image portion or make it larger to allow for a more accurate color measurement of the color patch after the color patch is printed.

For example, the comparison in S142 may include determining a difference between the patch color property and the image portion color property. The determined difference can be a difference between one, two, or more than two colorimetric parameter values or process color values. When using the L*a*b* color space, the determined difference can be the difference delta_L, which is: L* value of the image portion minus L* value of the patch. L* has a value from 0 (darkest) to Lmax (brightest), so the color patch is brighter than the image portion if the difference delta_L is negative (delta_L<0). If delta_L>0, the image portion is brighter than the color patch and may result in greater flare, so it may be desirable to change the layout of the color patch. A threshold value, t_L, can be used to determine whether there should be a change in layout. If delta_L>t_L, there should be a change in the layout of the color patch, otherwise no change. Threshold t_L could be a number greater than 20% of Lmax or a number greater than 50% of Lmax.

The determined difference can be the difference between two colorimetric parameter values, such as L* with a*, L* with b*, or a* with b*. The determined difference can include two distinct values: delta_L and delta_a. Difference delta_a is a* of the image portion minus a* of the patch. Colorimetric parameter a* represents red/green component colors and has a range from negative to positive, with a maximum negative value (most green) to a maximum positive (most red). Difference delta_a can be the square or absolute value of: a* value of the image portion minus a* value of the patch. A threshold value, t_a, can be used. If both delta_L>t_L and delta_a>t_a, then there should be a change in the layout of the color patch, otherwise no change.

Alternatively, a* could be replaced with b*. Colorimetric parameter b* represents yellow/blue component colors and has a range from negative to positive, with a maximum negative value (most blue) to a maximum positive (most yellow). Difference delta_b can be the square or absolute value of: b* of the image portion minus b* of the patch. A threshold value, t_b, can be used. If both delta_L>t_L and delta_b>t_b, then there should be a change in the layout of the color patch, otherwise no change.

The determined difference can be between three colorimetric parameter values, such as L*, a*, and b*. The determined difference can include three distinct values: delta_L, delta_a, and delta_b. If delta_L>t_L, delta_a>t_a, and delta_b>t_b, there should be a change in the layout of the color patch, otherwise no change.

The determined difference can be a combined difference of two colorimetric parameter values. For example, delta_E2 is the square root of: the square of delta_L, plus the square of delta_a. A threshold value, t_E2, can be used. If delta_E2>t_E2, then there should be a change in the layout of the color patch, otherwise no change. Alternatively, a* could be replaced with b*, so that delta_E2 is the square root of: the square of delta_L, plus the square of delta_b.

The determined difference can be a combined difference of three colorimetric parameter values. For example, delta_E3 is the square root of: the square of delta_L, plus the square of delta_a, plus the square of delta_b. A threshold value, t_E3, can be used. If delta_E3>t_E3, then there should be a change in the layout of the color patch, otherwise no change.

Referring again to block S142, the printer processor determines a layout of the color patch based on the comparison of color properties in terms of colorimetric parameters or process color values. The comparison of color properties may include determining a difference between the patch color property and the image portion color property. The color property may be a single, two, or three colorimetric parameters. With a single colorimetric parameter, the comparison of color properties may include determining a difference (delta_L or delta_a, for example) and determining whether it exceeds a threshold value (t_L or t_a, for example). With two colorimetric parameters, the comparison of color properties may include determining a difference having two distinct values (delta_L and delta_a, for example) and determining whether the difference exceeds a threshold (t_L and t_a, for example). From the descriptions herein, one of ordinary skill in the art may extrapolate these examples for two colorimetric parameters to three colorimetric parameters. Alternatively, the comparison of color properties may include determining a difference having a combined value (delta_E2 or delta_E3, for example) and determining whether it exceeds a threshold (t_E2 or t_E3, for example).

In other examples, a different color space could be used. For example, when the L*c*h* color space is used, any of a* and b* in the above descriptions could be replaced with c* and h*. In another example, process color values (such as CMYBK) can be used instead of L*c*h*.

The layout determination in block S142 of FIG. 7 can be performed for one, two, or more of color patches 1A to 1T. Next at block S144, the printer processor causes image 114 and color patches 1A to 1T to be printed together on a sheet. Based on the comparison of color properties of the color patch and image portion, it is possible that the determined layout of a particular patch is set to the initial layout of the patch. That is, no change is made to the layout of the patch. No layout change may result for all patches as shown in the example of FIGS. 5A and 5B, or it may result for some but not all of the patches.

Based on the comparison of color properties of the color patch and image portion, it is possible that the determined layout of a particular patch is different from the initial layout of the patch. Layout change may result for all patches, or it may result for some but not all of the patches as will be described in FIGS. 10A to 16B. The change in layout is intended to help reduce the effects of flare when color is later measured after printing.

Referring again to FIG. 7, the process proceeds to block S146 after printing in block S144. In S146, the color property of each color patch 1A to 1T is measured using an in-line color sensor. The sensor outputs measurement data that represents the measured color property. The measured color property is compared against a target color property for that particular color patch.

The method of comparison performed in block S146 may be performed like any of the examples described for block S142 which uses differences (deltas) between color properties of the color patch and image portion. For block S146, the term Delta_ with upper case letter "D" can be defined as the difference between the measured and target color property of a particular color patch. Following the example for delta_L, the difference Delta_L can be: measured $L^*$ of the patch minus target $L^*$ of the patch. Also, the difference Delta_a can be: measured $a^*$ of the patch minus target $a^*$ of the patch. In the same way, Delta_b, Delta_E2, and Delta_E3 follow from deta b, delta_E2, and delta_E3.

Next at S148, the printer processor checks whether the color output is good, meaning that the measured color properties of printed color patches 1A to 1T are acceptable. The determination method in block S148 may be performed like any of the examples described above for block S142 which checks whether one or more deltas exceed a threshold t. For block S148, the term T with upper case letter "T" can be defined as the threshold to be used for checking whether the color output is good. For example, if Delta_L>T_L or Delta_a>T_a, the color output is not good (S148:NO), otherwise it is good (S148:YES). Alternatively the difference can have two distinct values. For example, if both Delta_L>T_L and Delta_a>T_a, then the color output is not good (S148:NO), otherwise it is good (S148:YES). Alternatively, the difference can have three distinct values. For example, if both Delta_L>T_L, Delta_a>T_a, and Delta_b>T_b, then the color output is not good (S148:NO), otherwise it is good (S148:YES). Alternatively, the difference can be a combined difference. For example, if Delta_E2>T_E2 or Delta_E3>T_E3, then the color output is not good (S148:NO), otherwise it is good (S148:YES).

As discussed above, the comparison of color properties in block S148 may include determining a difference between a measured color property and a target color property. The color property may be a single, two, or three colorimetric parameters. With a single colorimetric parameter, the comparison of color properties may include determining a difference (Delta_L or Delta_a, for example) and determining whether it exceeds a threshold value (T_L or T_a, for example). With two colorimetric parameters, the comparison of color properties may include determining a difference having two distinct values (Delta_L and Delta_a, for example) and determining whether the difference exceeds a threshold (T_L and T_a, for example). From the descriptions herein, one of ordinary skill in the art may extrapolate these examples for two colorimetric parameters to three colorimetric parameters. Alternatively, the comparison of color properties may include determining a difference having a combined value (Delta_E2 or Delta_E3, for example) and determining whether it exceeds a threshold (T_E2 or T_E3, for example).

If the $L^*c^*h^*$ color space was used earlier in the process at block S130 and S138, then $a^*$ and $b^*$ in the above descriptions could be replaced with $c^*$ and $h^*$ when performing block S148. If process color values (such as CMYBK) were used earlier in the process at block S130 and 5138, then process color values could be used instead of $L^*a^*b^*$.

If at block S148 the color is not good (S148:NO), then the process proceeds to block S150 where an error message is shown or a color calibration is performed. The error message can be displayed on a monitor screen of the printing machine or transmitted through the network to a remote data processing apparatus. Performing the color calibration includes adjusting operational parameters of the printing machine based on the comparison result in block S146. For example, adjustment of operational parameters can be based on any of the Delta values described for block S146.

If at block S148 the color is good (S148:YES), then the process proceeds to loop end block S152. If the last page of the print job has been printed, the loop ends and the process may end.

FIGS. 10A to 16B show situations in which a change in patch layout is the result in block S142 in FIG. 7. As shown in these figures, there are various ways in which patch layout can be changed to help reduce the effects of flare when measuring a color property of a printed color patch.

FIGS. 10A and 10B show example layouts that could have been determined in block S142. FIG. 10A shows the determined layouts of color patches 1A to 1T before printing. FIG. 10B shows page 1 printed with image 114 together with color patches 1A to 1T printed according to their determined layouts. Positions of a first color patch (1N) and a second color patch (1F) are switched with each other, as compared to the initial layouts shown in FIG. 8. The determined print position of the first color patch (1N) is the initial position of the second color patch (1F), and the determined print position of the second color patch (1F) is the initial position of the first color patch (1N).

Figure 11A:
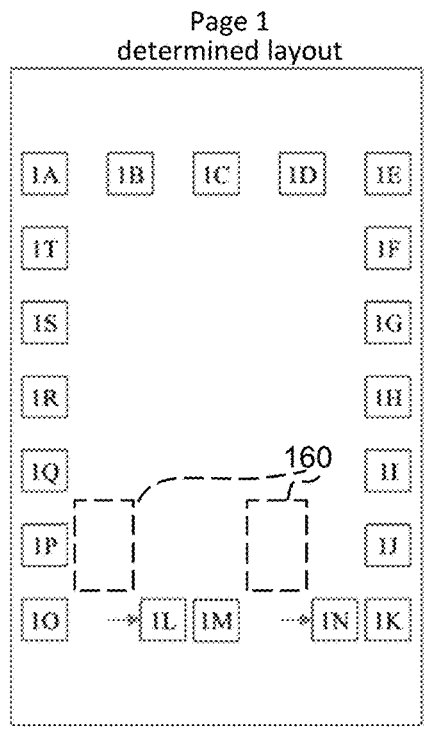
FIGS. 11A and 11B are plan view diagrams showing color patch layouts with two of the color patch layouts having been changed by moving print positions in a short-edge direction of the sheet.
Figure 11B:
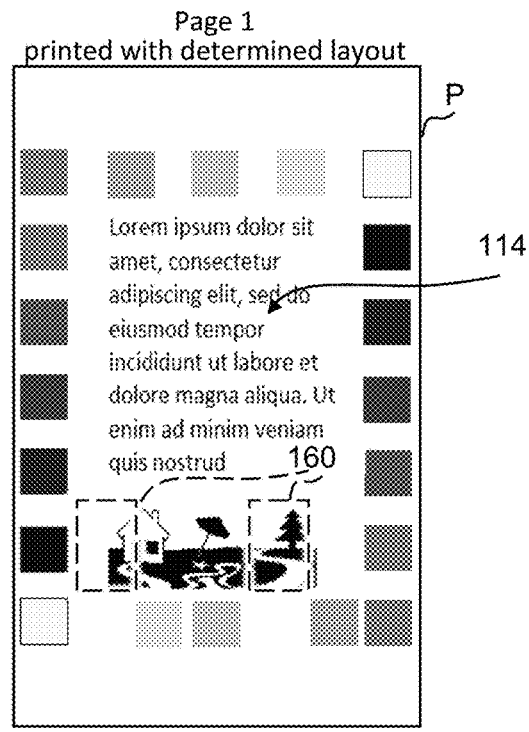

FIGS. 11A and 11B show example layouts that could have been determined in block S142. FIG. 11A shows the determined layouts of color patches 1A to 1T before printing. FIG. 11B shows page 1 printed with image 114 together with color patches 1A to 1T printed according to their determined layouts. Positions of a first color patch (1N) and a second color patch (1L) have been moved in a short-edge direction of the sheet. The short-edge direction is parallel to the short edge of sheet P. Layout is changed without any change in print size. In block S142, multiple image portions 160 could be as shown in FIG. 11A. To reduce the effect of flare, the determined print positions, relative to the initial print position (FIG. 8), is further away from where image portion 160 is printed (FIG. 11B).

Figure 12A:
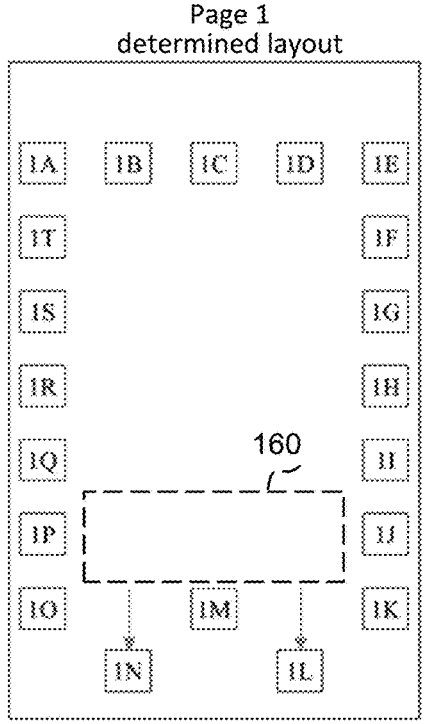
FIGS. 12A and 12B are plan view diagrams showing color patch layouts with two of the color patch layouts having been changed by moving print positions in a long-edge direction of the sheet.
Figure 12B:
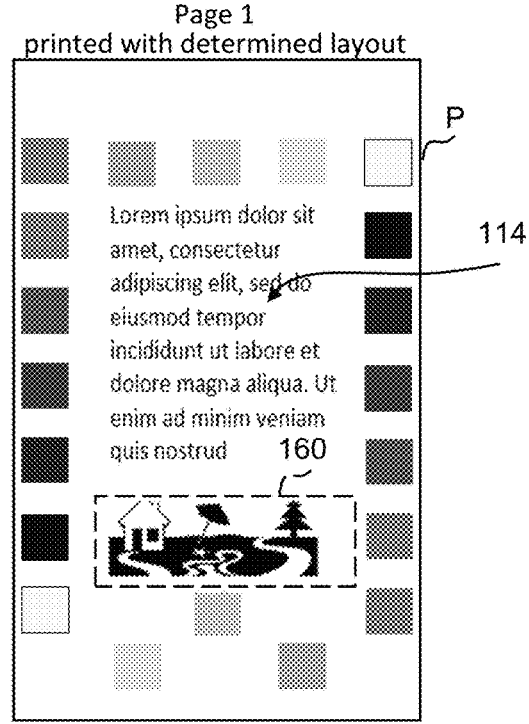

FIGS. 12A and 12B are the same as FIGS. 11A and 11B except print positions have been moved in a long-edge direction of the sheet. The long-edge direction is parallel to the long edge of sheet P. In another example, print positions are moved in both the short-edge and long-edge directions.

Figure 13A:
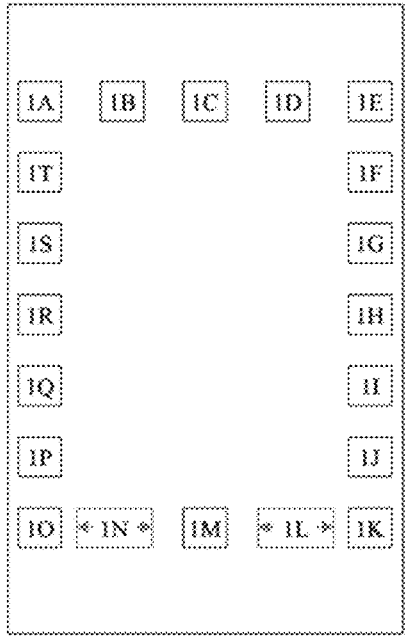
FIGS. 13A and 13B are plan view diagrams showing color patch layouts with two of the color patch layouts having been changed by enlarging print sizes in a short-edge direction of the sheet.
Figure 13B:
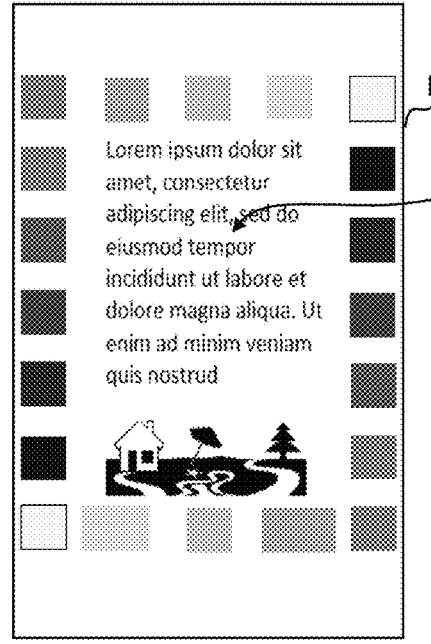

FIGS. 13A and 13B show example layouts that could have been determined in block S142. FIG. 13A shows the determined layouts of color patches 1A to 1T before printing. FIG. 13B shows page 1 printed with image 114 together with color patches 1A to 1T printed according to their determined layouts. Positions of a first color patch (1N) and a second color patch (1L) have been changed by enlarging print size in a short-edge direction of the sheet. The print size in the determined layout is larger than in the initial layout. The enlarged print sizes provide a greater sample area that could reduce the effect of flare from the adjacent image portion and increase the accuracy in measuring color property of the printed color patch by, for example, calculating an average color property for the color patch entirely (i.e., the entire color patch is used to calculate an average color property of the color patch) or by removing or disregarding an area of the color patch affected by flare when calculating the color property for the color patch (i.e., a limited portion of the color patch is used to calculate a color property of the color patch).

Figure 14A:
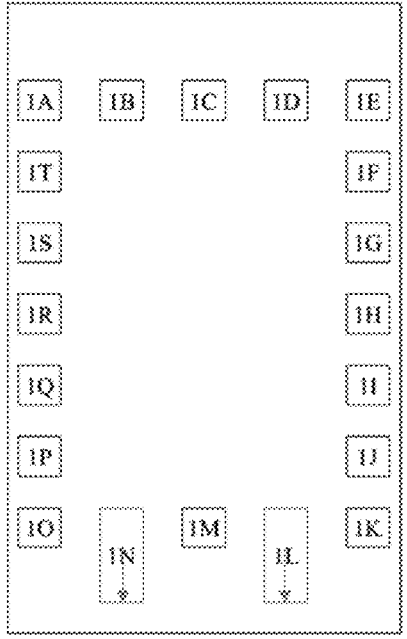
FIGS. 14A and 14B are plan view diagrams showing color patch layouts with two of the color patch layouts having been changed by enlarging print sizes in a long-edge direction of the sheet.
Figure 14B:

FIGS. 14A and 14B are the same as FIGS. 13A and 13B except the layouts of the first color patch (1N) and the second color patch (1L) have been changed by enlarging print size in a long-edge direction of the sheet. In another example, print sizes are enlarged in both the short-edge and long-edge directions. In further examples, print sizes are enlarged in short-edge and/or long-edge directions, while also print positions are moved in short-edge and/or long-edge directions.

Figure 15A:
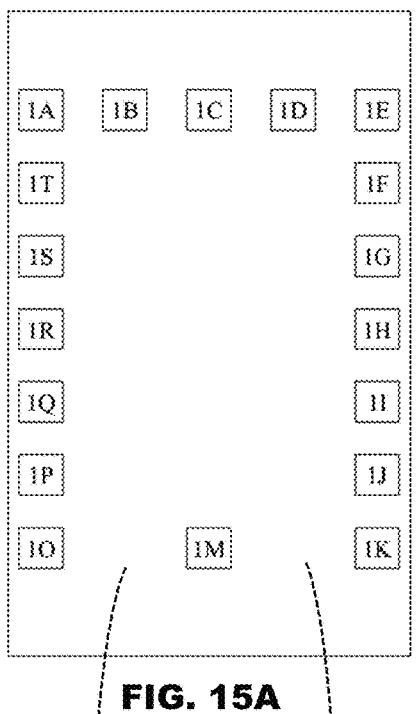
FIGS. 15A, 15B, 16A, and 16B are plan view diagrams showing color patch layouts with two of the color patch layouts having been changed by moving print positions to a different page.
Figure 15B:
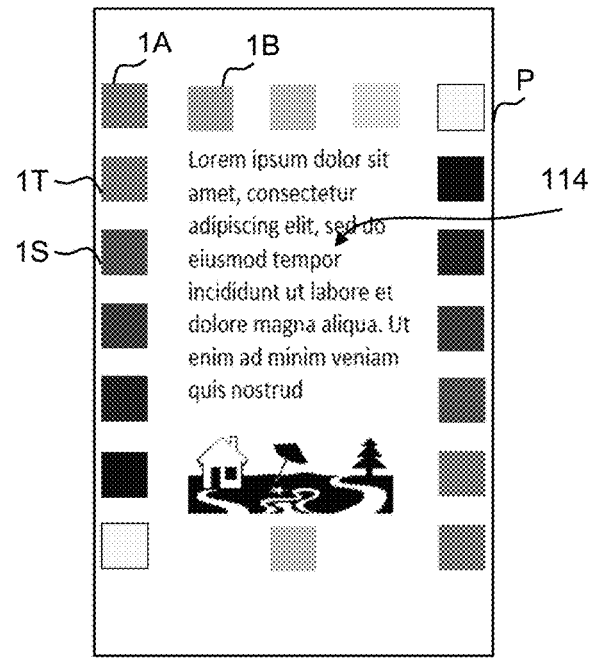
Figure 16A:
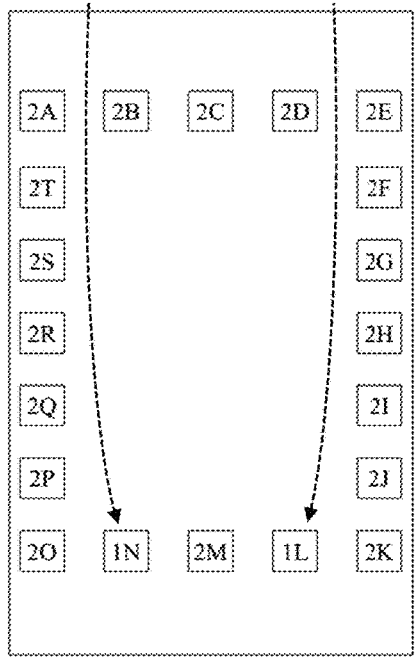
Figure 16B:
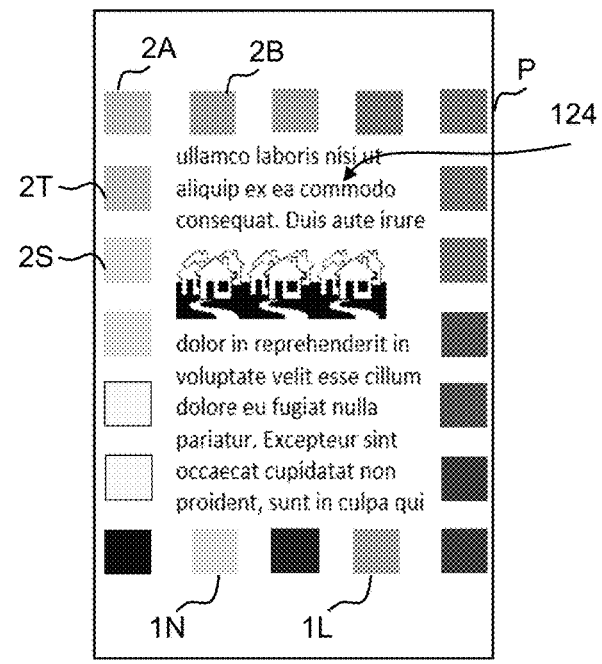

FIGS. 15A to 16B show example layouts that could have been determined in block S142. FIGS. 15A and 16A shows the determined layouts of color patches 1A to 1T before printing. FIGS. 15B and 16B shows pages 1 and 2 printed with images together with color patches. In block S142, the color properties of color patches 1A to 1T were compared with color properties of different portions 160 of image 114, as illustrated in FIG. 9. The result in this example is that the print positions of a first color patch (1N) and a second color patch (1L) have been shifted to another page. The determined print positions cause the color patches (1L and 1N) to be printed on a sheet of paper (for page 2, for example) that is different from that on which image 114 is printed.

Referring again to FIG. 5B, job information 120 can be printed in trim area 112 together with color patches. Job information 120 may also result in flare when measuring a color property of a printed color patch near job information 120. To reduce the effect of flare, a color may be selected having a hue that matches that of the neighboring color patch, and the job information is then printed using the selected color. For example, if the hue of the neighboring color patch is bright orange, then the job information is also printed in bright orange. In this manner, subsequent measurement of the color property of the neighboring color patch is less likely to be affected by the presence of job information on the sheet.

While several particular forms of the invention have been illustrated and described, it will also be apparent that various modifications can be made without departing from the scope of the invention. It is also contemplated that various combinations or subcombinations of the specific features and aspects of the disclosed embodiments can be combined with or substituted for one another in order to form varying modes of the invention. Accordingly, it is not intended that the invention be limited, except as by the appended claims.

What is claimed is:

1. A method with color patch layout determination, the method comprising:
    storing a patch color property of a color patch before the color patch is printed, the color patch having an initial print position;
    determining an image portion color property of a portion of an image before the image is printed, the portion of the image being nearest to the initial print position as compared to other portions of the image;
    comparing the patch color property and the image portion color property; and
    determining a layout of the color patch based on the comparison of color properties, the determined layout for use in printing the color patch and including any of a determined print size of the color patch and a determined print position of the color patch which differs from or is the same as the initial print position.

2. The method of claim 1, wherein the comparison of color properties includes determining a difference between the patch color property and the image portion color property, and the determined difference is a difference between one, two, or more than two colorimetric parameter values.

3. The method of claim 1, further comprising:
    storing an initial layout before the determining of the layout of the color patch, the initial layout including an initial print size of the color patch and the initial print position of the color patch,
    wherein the determined layout of the color patch is set such that: (a) the determined print size is larger than the initial print size, (b) the determined print position, relative to the initial print position, is further away from where the image portion will be printed, (c) the determined print position will cause the color patch to be printed on a sheet of paper that is different from that on which the image will be printed, or (d) the determined print position and size are set equal to the initial print position and size.

4. The method of claim 1, wherein the color patch is referred to as the first color patch, and the method further comprises:
    storing a patch color property for a second color patch before the first and second color patches are printed;
    determining an image portion color property of a second portion of the image before the image is printed;
    comparing the patch color property of the second color patch and the image portion color property of the second portion of the image; and
    determining a layout of the second color patch based on the comparison of color properties of the second color patch and the second image portion, the determined layout of the second color patch including any of a determined print size of the second color patch and a determined print position of the second color patch which are to be used when printing the second color patch.

5. The method of claim 4, further comprising:
    storing, before the determining of the layout of the first color patch, the initial print position of the first color patch to be used when printing the first color patch; and
    storing, before the determining of the layout of the second color patch, an initial print position of the second color patch to be used when printing the second color patch,
    wherein positions of the first and second color patches are switched in the determined layouts of the first and second patches, such that: the determined print position of the first color patch is the initial position of the second color patch, and the determined print position of the second color patch is the initial position of the first color patch.

6. The method of claim 1, further comprising:
    printing the image; and
    printing the color patch according to the determined layout,
    wherein the image is printed on a main area of a sheet, and the color patch printed is on a trim area of the sheet, and the trim area does not overlap the main area.

7. The method of claim 6, further comprising:
selecting a color having a hue that matches that of the color patch; and
printing job information using the selected color,
wherein the job information includes text that identifies or describes a print job to which the image belongs, and the job information is printed on the trim area of the sheet.

8. The method of claim 7, further comprising:
using a color sensor to measure a color property of the color patch that was printed on the trim area of the sheet; and
comparing the measured color property to a target color property.

9. The method of claim 6, further comprising separating the trim area of the sheet from the main area by making a cut in the sheet between the image and the color patch.

10. A printing system for color patch layout determination, the system comprising:
a printer;
a memory; and
a printer processor configured to:
control the printer,
store, in the memory, a patch color property of a color patch before the color patch is printed by the printer, the color patch having an initial print position,
determine an image portion color property of a portion of an image before the image is printed by the printer, the portion of the image being nearest to the initial print position as compared to other portions of the image,
compare the patch color property and the image portion color property, and
determine a layout of the color patch based on the comparison of color properties, the determined layout for use by the printer in printing the color patch and including any of a determined print size of the color patch and a determined print position of the color patch which differs from or is the same as the initial print position.

11. The system of claim 10, wherein the comparison of color properties includes determining a difference between the patch color property and the image portion color property, and the determined difference is a difference between one, two, or more than two colorimetric parameter values.

12. The system of claim 10, wherein the printer processor is further configured to:
store, in the memory, an initial layout before the determining of the layout of the color patch, the initial layout including an initial print size of the color patch and the initial print position of the color patch,
wherein the determined layout of the color patch is set such that: (a) the determined print size is larger than the initial print size, (b) the determined print position, relative to the initial print position, is further away from where the image portion will be printed, (c) the determined print position will cause the color patch to be printed on a sheet of paper that is different from that on which the image will be printed, or (d) the determined print position and size are set equal to the initial print position and size.

13. The system of claim 10, wherein the color patch is referred to as the first color patch, and the processor is further configured to:
store, in the memory, a patch color property for a second color patch before the first and second color patches are printed;
determine an image portion color property of a second portion of the image before the image is printed;
compare the patch color property of the second color patch and the image portion color property of the second portion of the image; and
determine a layout of the second color patch based on the comparison of color properties of the second color patch and the second image portion, the determined layout of the second color patch including any of a determined print size of the second color patch and a determined print position of the second color patch which are to be used when printing the second color patch.

14. The system of claim 13, wherein the processor is further configured to:
store, before the determining of the layout of the first color patch, the initial print position of the first color patch to be used when printing the first color patch; and
store in the memory, before the determining of the layout of the second color patch, an initial print position of the second color patch to be used when printing the second color patch,
wherein positions of the first and second color patches are switched in the determined layouts of the first and second patches, such that: the determined print position of the first color patch is the initial position of the second color patch, and the determined print position of the second color patch is the initial position of the first color patch.

15. The system of claim 10, wherein the processor is further configured to:
instruct the printer to print the image; and
instruct the printer to print the color patch according to the determined layout,
wherein the image is printed on a main area of a sheet, and the color patch printed is on a trim area of the sheet, and the trim area does not overlap the main area.

16. The system of claim 15, wherein the processor is further configured to:
select a color having a hue that matches that of the color patch; and
instruct the printer to print job information on the sheet using the selected color,
wherein the job information includes text that identifies or describes a print job to which the image belongs, and the job information is printed on the trim area of the sheet.

17. The system of claim 16, further comprising a color sensor, wherein the processor is further configured to:
instruct the color sensor to measure a color property of the color patch that was printed on the trim area of the sheet; and
compare the measured color property to a target color property.

18. The system of claim 15, further comprising a finishing device, and the printer processor is configured to cause separation of the trim area from the main area by instructing the finishing device to make a cut in the sheet between the image and the color patch.

19. A non-transitory computer readable medium having a program stored therein for controlling a printing system, the program causing a printer processor of the printing system to execute a process for color patch layout determination, the process comprising:
storing a patch color property of a color patch before the color patch is printed, the color patch having an initial print position;

determining an image portion color property of a portion of an image before the image is printed, the portion of the image being nearest to the initial print position as compared to other portions of the image;

comparing the patch color property and the image portion color property; and determining a layout of the color patch based on the comparison of color properties, the determined layout for use in printing the color patch and including any of a determined print size of the color patch and a determined print position of the color patch which differs from or is the same as the initial print position.

20. The non-transitory computer readable medium of claim 19, wherein the comparison of color properties includes determining a difference between the patch color property and the image portion color property, and the determined difference is a difference between one, two, or more than two colorimetric parameter values.

* * * * *